(12) United States Patent
Johnson et al.

(10) Patent No.: US 7,389,854 B1
(45) Date of Patent: Jun. 24, 2008

(54) COLLAPSIBLE HUNTING STAND FOR MULTI-TERRAIN VEHICLES

(76) Inventors: Doug R. Johnson, 5315 Paces La., Mims, FL (US) 32754; Randy Futch, 3434 Bayfield St., Cocoa, FL (US) 32926

( * ) Notice: Subject to any disclaimer, the term of this patent is extended or adjusted under 35 U.S.C. 154(b) by 384 days.

(21) Appl. No.: 11/024,602

(22) Filed: Dec. 30, 2004

(51) Int. Cl.
*E06C 5/00* (2006.01)
(52) U.S. Cl. .................................. 182/127; 182/63.1
(58) Field of Classification Search .............. 182/127, 182/63.1, 115
See application file for complete search history.

(56) References Cited

U.S. PATENT DOCUMENTS

| | | | | |
|---|---|---|---|---|
| 2,593,386 A | * | 4/1952 | Dirks | ........................ 182/152 |
| 2,680,196 A | * | 6/1954 | Fox et al. | ............... 174/138 A |
| 4,696,374 A | | 9/1987 | Hale | |
| 4,787,477 A | * | 11/1988 | Dolan | ........................ 182/116 |
| 4,800,986 A | * | 1/1989 | Hayes, III | .................... 182/18 |
| 5,042,614 A | | 8/1991 | Rainey | |
| 5,297,844 A | | 3/1994 | Haustein | |
| 6,105,721 A | | 8/2000 | Haynes | |
| 6,550,575 B2 | | 4/2003 | Spencer et al. | |
| 6,604,606 B1 | * | 8/2003 | McDougal et al. | .......... 182/127 |
| 2003/0155179 A1 | | 8/2003 | McDougal et al. | |
| 2005/0140187 A1 | * | 6/2005 | Kordecki | .................... 297/162 |
| 2005/0274573 A1 | * | 12/2005 | Smith | ........................ 182/127 |

* cited by examiner

*Primary Examiner*—Alvin C Chin-Shue (57) ABSTRACT

A collapsible hunting stand for multi-terrain vehicles includes racks having connected tubes and support plates attached thereto and a frame having leg members with bottom ends disposed adjacent to the racks. The stand further includes a first plurality of cross braces defining steps and a second plurality of cross braces to maintain the frame at a stable position when adapted to a raised position. Locking flange portions are selectively spaced along the second plurality of cross braces and the leg members. A seat section is attached to the frame and an elastic strap traverses across the width of the frame for assisting to maintain the stand at a stable position during non-operating conditions. The stand further includes an elongated support rod attached to a tow ball of a vehicle.

6 Claims, 10 Drawing Sheets

COLLAPSIBLE HUNTING STAND FOR MULTI-TERRAIN VEHICLES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a hunting stand and, more particularly, to a collapsible hunting stand for multi-terrain vehicles.

2. Prior Art

When hunting in flatlands or in areas where timber has previously been cut, trees are not available for standard hunting stands. Elevated observation stands, providing secure seating and a wide visual range for hunters, are desirable when hunting deer and other game in forested areas, fields, and reforesting areas.

The relatively easy access to these areas now provided by all terrain vehicles (ATVs) has encouraged the development of such stands to be used while mounted on ATVs. The seating platforms of such stands have heretofore been fixed and not adjustable as to their angularity, limiting their functionality.

Furthermore, hunting stands for all terrain vehicles are well-known in the patented prior art that have portable stands partially supported by the vehicle and which abut against a tree for further support. These devices are unsuitable for use in flatlands or in areas where a forest has been harvested since no trees are available to support the stand. Yet another hunting stand in the prior art is partially supported by the vehicle and partially supported by the ground. A major drawback of this stand is that its height is limited. Moreover, like the other prior stands, it is rather cumbersome and difficult to erect and strike.

Accordingly, a need remains for a collapsible hunting stand for multi-terrain vehicles to overcome the above-noted shortcomings. The present invention satisfies such a need by providing a versatile hunting stand that is useable in all hunting locations and easy to set up. Such a stand has appeal to hunters who like to change locations often or those who have many hunting areas.

BRIEF SUMMARY OF THE INVENTION

In view of the foregoing background, it is therefore an object of the present invention to provide an apparatus for a collapsible hunting stand for multi-terrain vehicles. These and other objects, features, and advantages of the invention are provided by a hunting stand for supporting an operator at an elevated position.

The stand includes a plurality of racks securely welded to front and rear portions of a vehicle and extending upwardly therefrom. Such racks include a plurality of connected tubes and a plurality of support plates attached thereto respectively. The support plates have a predetermined surface area spanning above the racks respectively. The stand preferably includes a plurality of U-shaped brackets and a plurality of associated anchor bolts connected thereto. Such U-shaped brackets advantageously maintain the support plates securely attached to the front and rear racks respectively wherein the leg members have substantially square cross-sections spaced adjacent to the U-shaped brackets and are independently maintained at a substantially stable position during operating conditions.

The present invention further includes a frame having a substantially A-shape that is selectively adaptable between lowered and raised positions. Such a frame includes a plurality of elongated leg members having bottom end portions disposed adjacent to the racks wherein front and rear pairs of the leg members are positioned at the front and rear vehicle portions respectively. The frame further includes a plurality of support members each having an open upper end portion and a lower end portion defining a cavity therebetween. The upper end portions receive the bottom end portions of the plurality of elongated leg members therein respectively. The stand preferably further includes a first plurality of fastening members for pivotally connecting the lower end portions to the racks.

Such first fastening members include a bolt and locknut secured thereto. A second plurality of fastening members may pivotally connect the front leg pair to the front rack. Such second fastening members include a bolt and wing nut threadably attached thereto for allowing an operator to conveniently readily detach the front leg pair during non-operating conditions.

A first plurality of cross braces is secured medially of the front and rear leg pairs respectively for defining a plurality of steps onto which an operator may conveniently climb. A second plurality of cross braces are pivotally connected to the frame and are disposed intermediately of the front and rear leg pairs for advantageously assisting to maintain the frame at a substantially stable position when adapted to a raised position. One of the second cross braces may be positionable along a substantially horizontal plane and other ones of the second cross braces extend obliquely and upwardly from the rear leg pair respectively.

Furthermore, a plurality of locking flange portions are selectively spaced along associated lengths of the second cross braces and the leg members. Such locking flange portions are alignable and selectively engageable when the frame is moved to the raised position. A plurality of brackets, each having a substantially L-shape, connect the leg members to the racks respectively.

The stand also includes a seat section attached to an apex of the frame that is advantageously adaptable between operable and non-operable positions as desired by a user. Such a seat section preferably includes pivotally connected lower and rear portions and a tray laterally extending from the lower portion. The tray is conveniently provided with a cup holder disposed horizontally to the lower portion.

In an alternate embodiment, the seat section includes an elongated pole extending substantially vertically therefrom. Such a pole has a base portion for providing rigidity and for maintaining the pole at a substantially stable position during operating conditions. The pole further includes a hook portion for attaching an umbrella or other apparatus thereto and for providing shade to a user. The seat section further includes a plurality of light emitting devices attached thereto for providing illumination so that spectators are aware of the stand during nighttime conditions. Of course, a plethora of other accessories and equipment such as a medical kit, stretcher, and flotation devices may be attached to the stand so that they are readily accessible to a user.

An elastic strap is removably attachable to the rear rack and traverses across a width of the frame for advantageously assisting to maintain the stand at a substantially stable position during non-operating conditions. An elongated support rod having an annular female end portion is adjustably attached to a tow ball of the vehicle. Such a rod has a male end portion oppositely disposed from the female end portion for engaging a selected portion of the frame during non-operating conditions wherein the rod extends rearwardly and upwardly from the vehicle towards the frame.

The front leg pairs are detachable from the front rack when the frame is moved to a lowered position so that the stand can conveniently be folded and aligned rearwardly of the vehicle while allowing the operator to be seated in a driver seat to transport the vehicle. Such first and second leg pairs have a greater length than the first and second cross braces respectively.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-10 by the reference numeral 10 and is intended to provide a collapsible hunting stand for multi-terrain vehicles. It should be understood that the apparatus 10 may be used for many different types of occasions where an elevated point of view is needed, such as life-guarding, and not only for hunting.

Figure 1:
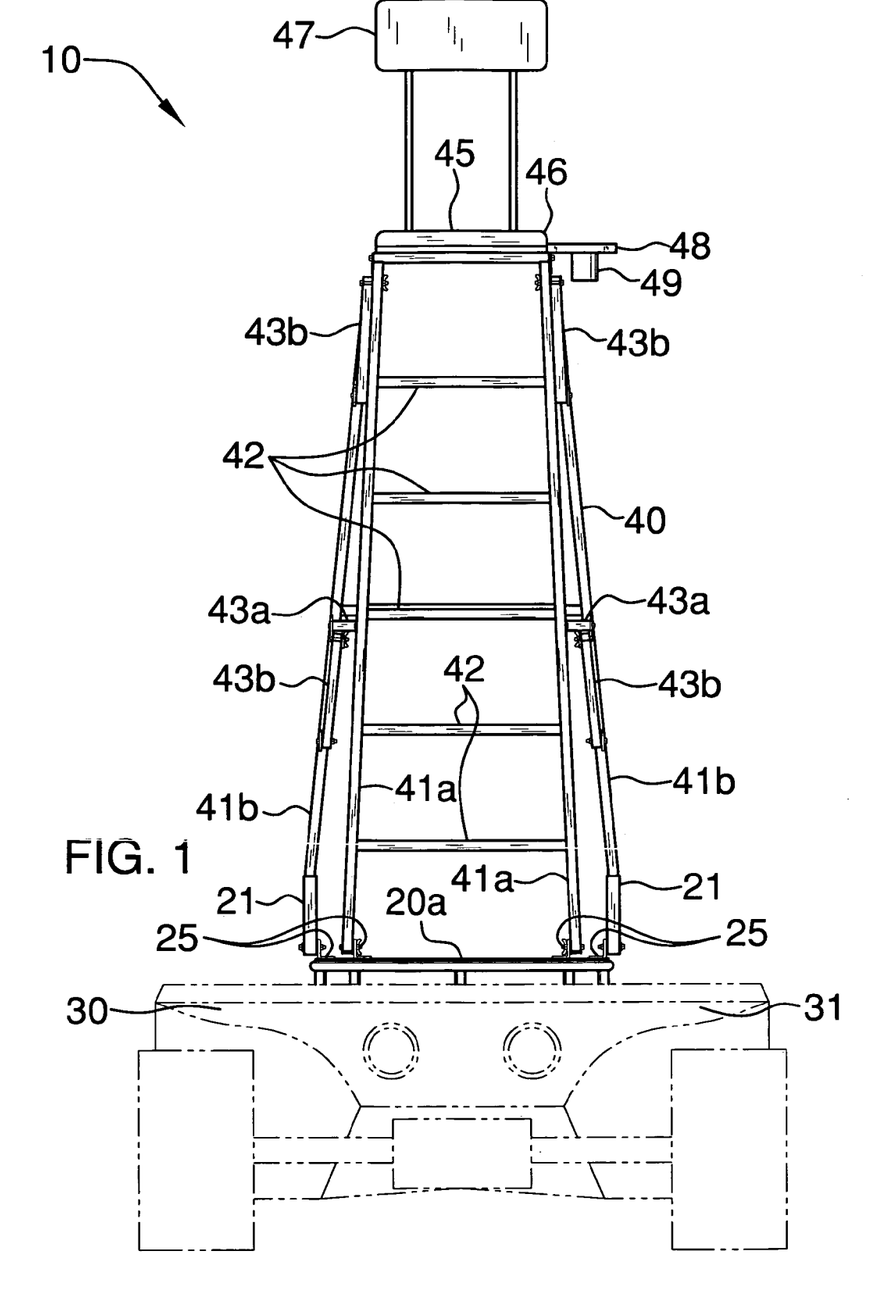
FIG. 1 is a front elevational view showing a collapsible hunting stand for multi-terrain vehicles, in accordance with the present invention.

Referring initially to FIG. 1, the apparatus 10 includes a plurality of racks 20 securely welded to front 31 and rear 32 portions of a vehicle 30 and extending upwardly therefrom. Such racks 20 include a plurality of connected tubes 21 and a plurality of support plates 22 attached thereto respectively. Welding of the racks 20 to the front 31 and rear 32 portions of the vehicle 30 advantageously allows the stand 10 to be adapted to a wide variety of all-terrain vehicles. The support plates 22 have a predetermined surface area spanning above the racks 20 respectively. The stand 10 includes a plurality of U-shaped brackets 23 and a plurality of associated anchor bolts 24 connected thereto, as shown in FIGS. 7 thru 10. Such U-shaped brackets 23 advantageously maintain the support plates 22 securely attached to the front 20a and rear 20b racks respectively wherein the leg members 41 (described herein below) have substantially square cross-sections spaced adjacent to the U-shaped brackets 23 and are independently maintained at a substantially stable position during operating conditions.

Figure 3:
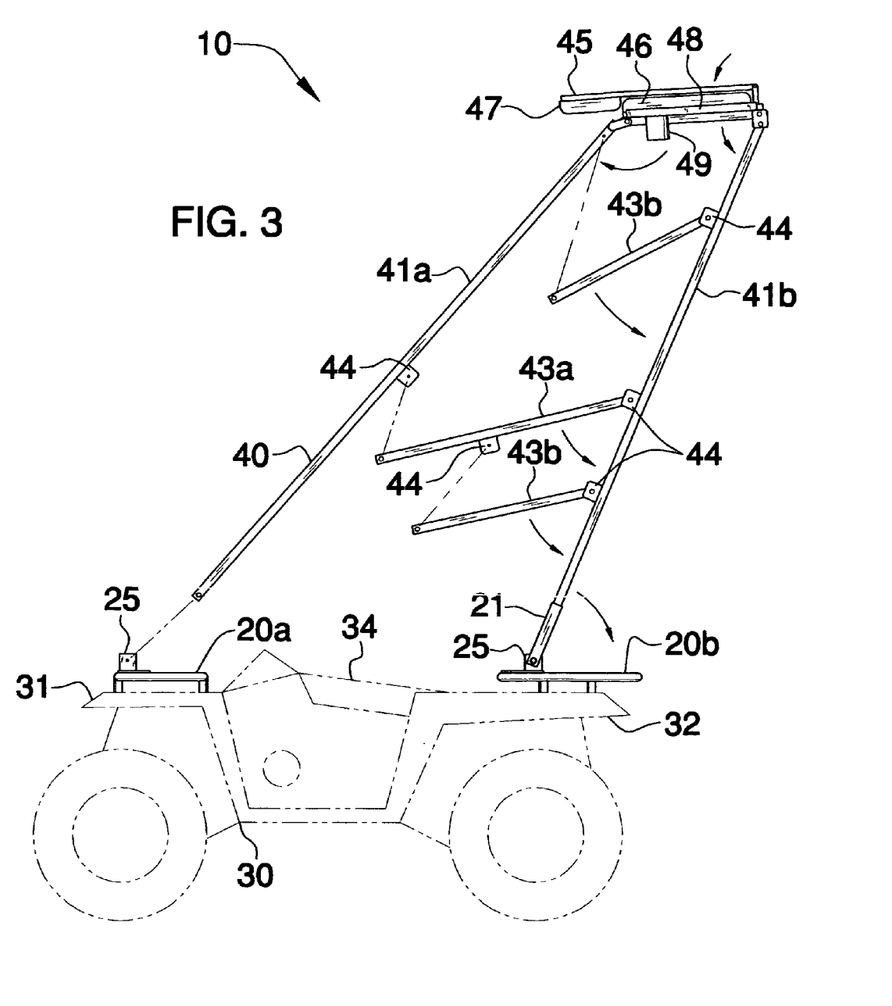
FIG. 3 is a side elevational view of the apparatus shown in FIG. 1, showing the stand in a partially collapsed state.
Figure 4:
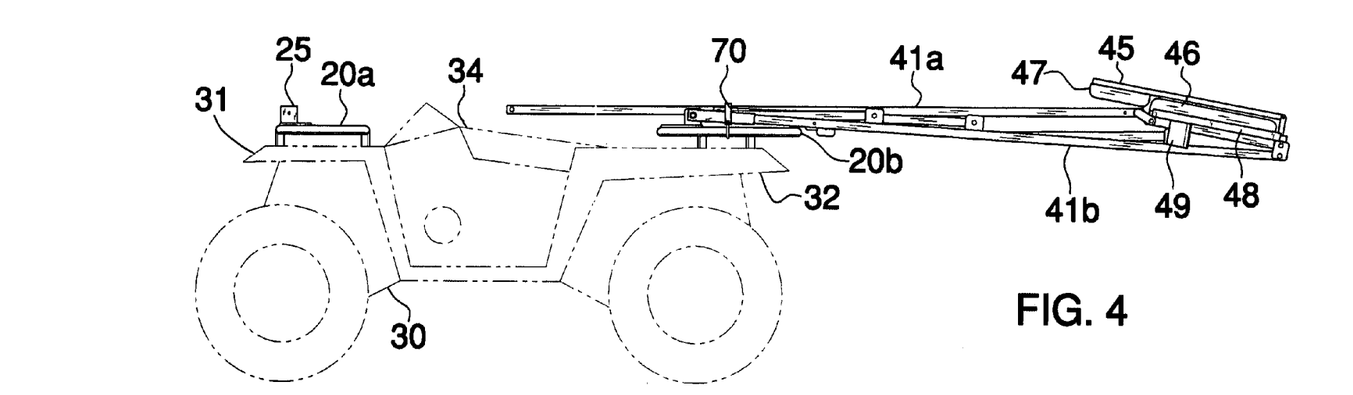
FIG. 4 is a side elevational view showing the apparatus in FIG. 1 in a completely collapsed state.
Figure 5:
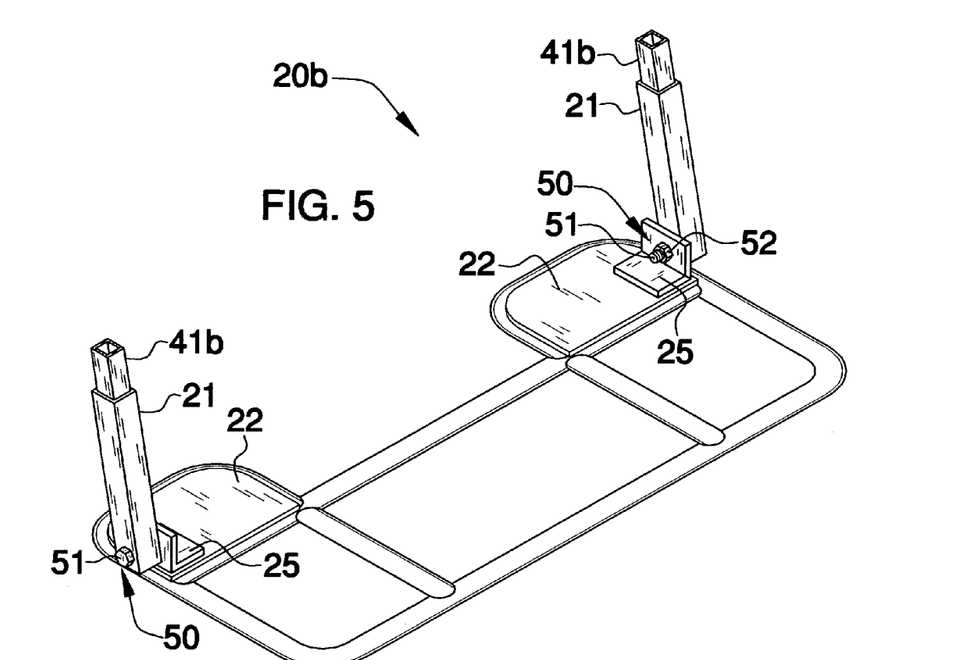
FIG. 5 is an enlarged perspective view of the front rack shown in FIG. 2.
Figure 6:
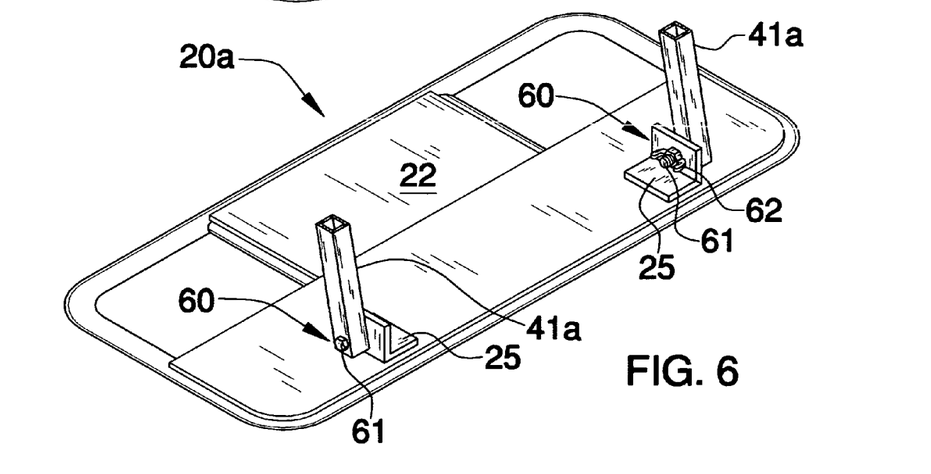
FIG. 6 is an enlarged perspective view of the rear rack shown in FIG. 2.
Figure 7:
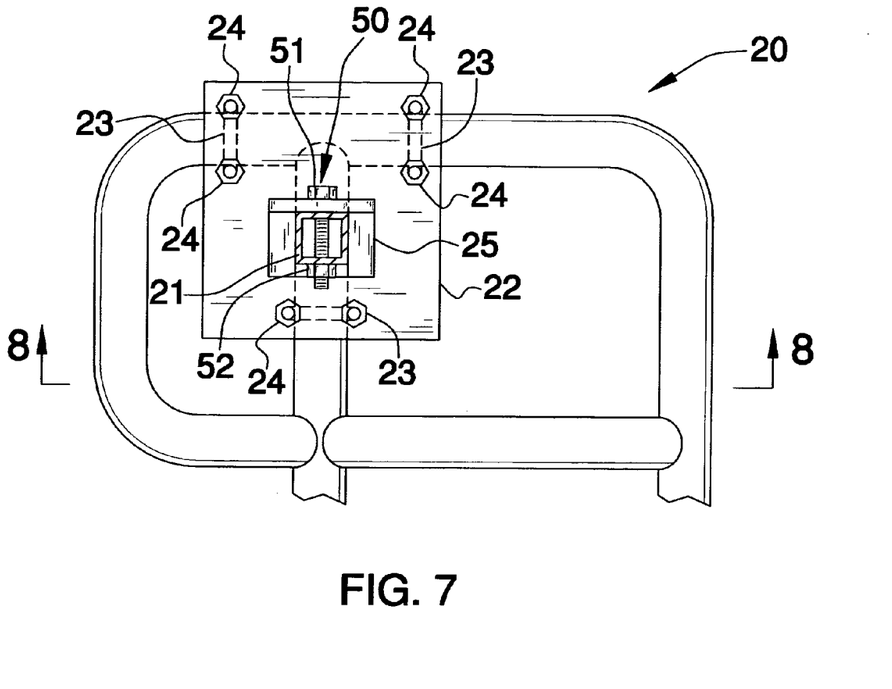
FIG. 7 is an enlarged top-plan view of the fastening member shown in FIG. 5.
Figure 8:
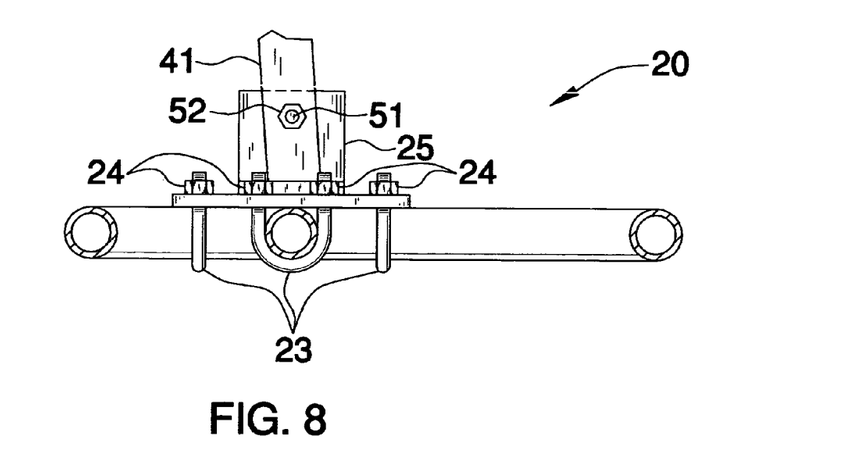
FIG. 8 is a cross-sectional view of the apparatus shown in FIG. 7, taken along line 8-8.
Figure 9:
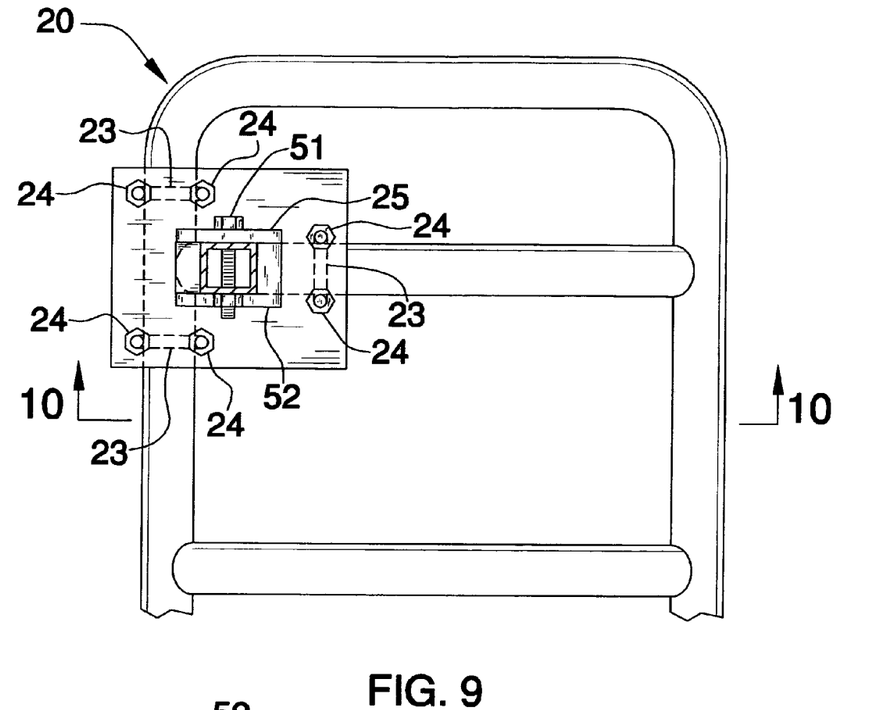
FIG. 9 is an enlarged top-plan view of the fastening member shown in FIG. 6.
Figure 10:
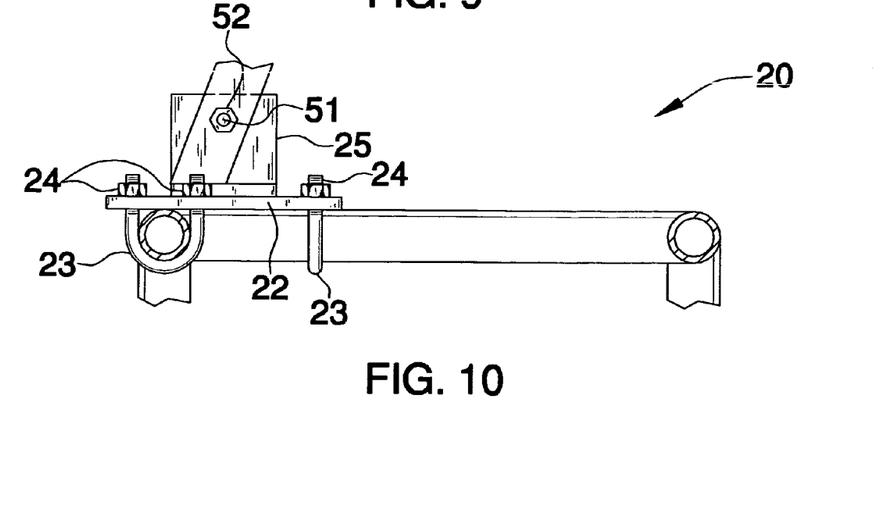
FIG. 10 is a cross-sectional view of the apparatus shown in FIG. 9, taken along line 10-10.
Figure 11:
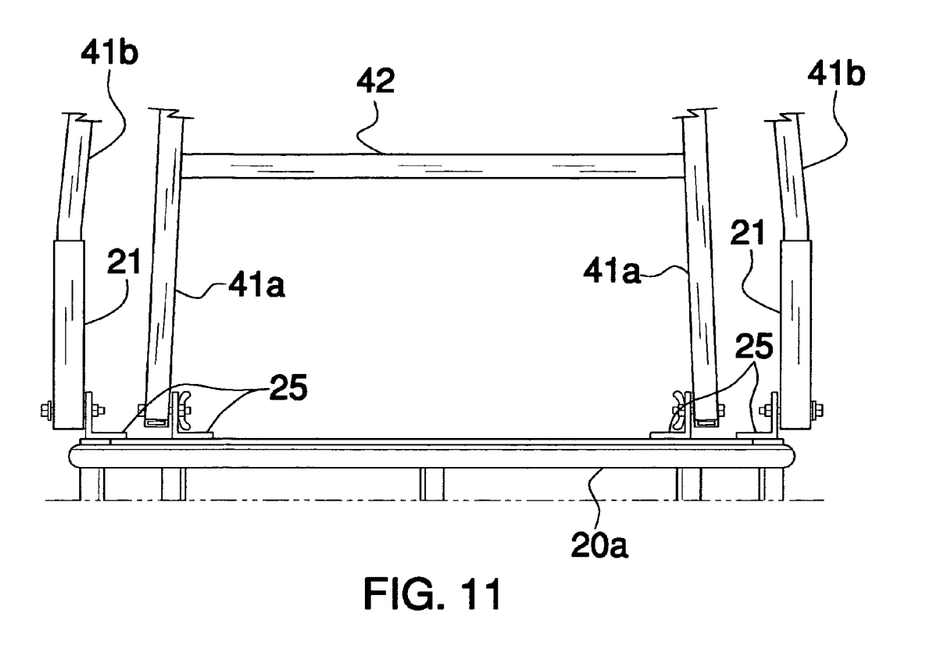
FIG. 11 is a partial rear elevational view showing the support members and leg members pivotally connected to the racks.

The present invention further includes a frame 40 having a substantially A-shape that is selectively adaptable between lowered and raised positions, as can be seen in FIGS. 3 and 4. Such a frame 40 includes a plurality of elongated leg members 41 having bottom end portions disposed adjacent to the racks 20a,b wherein front 41a and rear 41b pairs of the leg members 41 are positioned at the front 31 and rear 32 vehicle portions respectively. The frame 40 further includes a plurality of support members 55 each having an open upper end portion 56 and a lower end portion 57 defining a cavity therebetween, as shown in FIG. 6. The upper end portions 56 receive the bottom end portions of the plurality of elongated leg members 41 therein respectively. The stand 10 preferably further includes a first plurality of fastening members 50 for pivotally connecting the lower end portions 57 to the racks 20, as shown in FIG. 5.

Such first fastening members 50 include a bolt 51 and locknut 52 secured thereto. A second plurality of fastening members 60, illustrated in FIG. 6, pivotally connects the front leg pair 41a to the front rack 20a. Such second fastening members 60 include a bolt 61 and wing nut 62 threadably attached thereto for allowing an operator to conveniently and readily detach the front leg pair 41a during non-operating conditions, thus advantageously saving time when moving from one hunting location to the next.

A first plurality of cross braces 42 is secured medially of the front 41a and rear 41b leg pairs respectively for defining a plurality of steps 42 onto which an operator can conveniently climb. A second plurality of cross braces 43 are pivotally connected to the frame 40 and disposed intermediately of the front 41a and rear 41b leg pairs for advantageously assisting to maintain the frame 40 at a substantially stable position when adapted to a raised position. The cross braces 42, 43 advantageously increase the rigidity of the stand 10, allowing a user freedom of movement on the seat section 45 without having to worry about toppling over and sustaining an injury. One 43a of the second cross braces 43 is positionable along a substantially horizontal plane and other ones 43b of the second cross braces 43 extend obliquely and upwardly from the rear leg pair 41b respectively.

Figure 2:
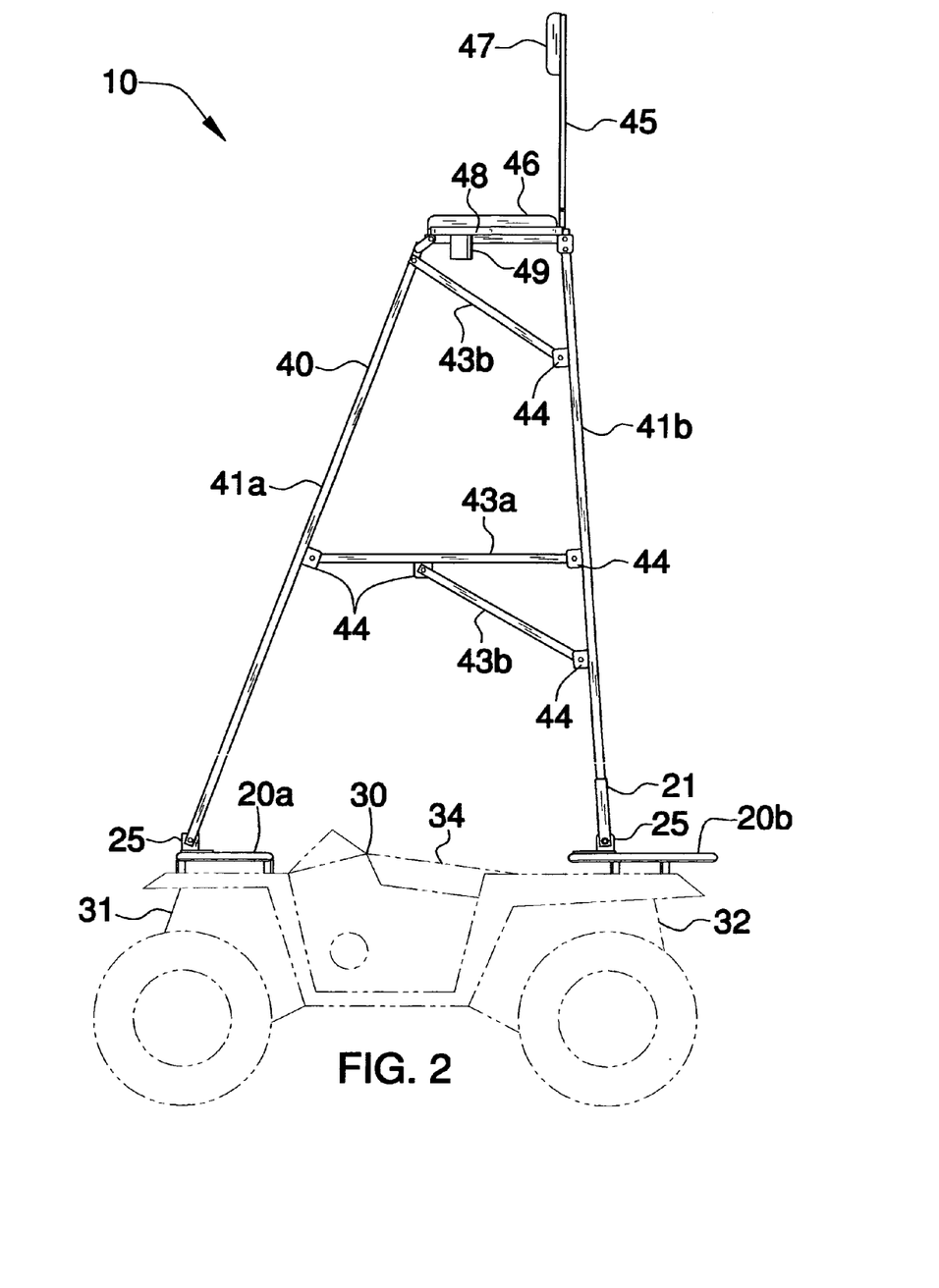
FIG. 2 is a side elevational view of the apparatus shown in FIG. 1.

Furthermore, a plurality of locking flange portions 44 are selectively spaced along associated lengths of the second cross braces 43 and the leg members 41. Such locking flange portions 44 are alignable and selectively engageable when the frame 40 is moved to the raised position, as shown in FIGS. 2 and 3. A plurality of brackets 25, each having a substantially L-shape, connect the leg members 41 to the racks 20a, b respectively.

The stand 10 also includes a seat section 45 attached to an apex of the frame 40 that is advantageously adaptable between operable and non-operable positions as desired by a user and as illustrated in FIG. 3. Such a seat section 45 includes pivotally connected lower 46 and rear 47 portions and a tray 48 laterally extending from the lower portion 46. The tray 48 is conveniently provided with a cup holder 49 disposed horizontally to the lower portion 46. Such a tray 48 and cup holder 49 conveniently allow a user to have a supply of food and water with them while on the stand 10 for extended periods, thereby improving their chances of encountering hunted prey.

Figure 12:
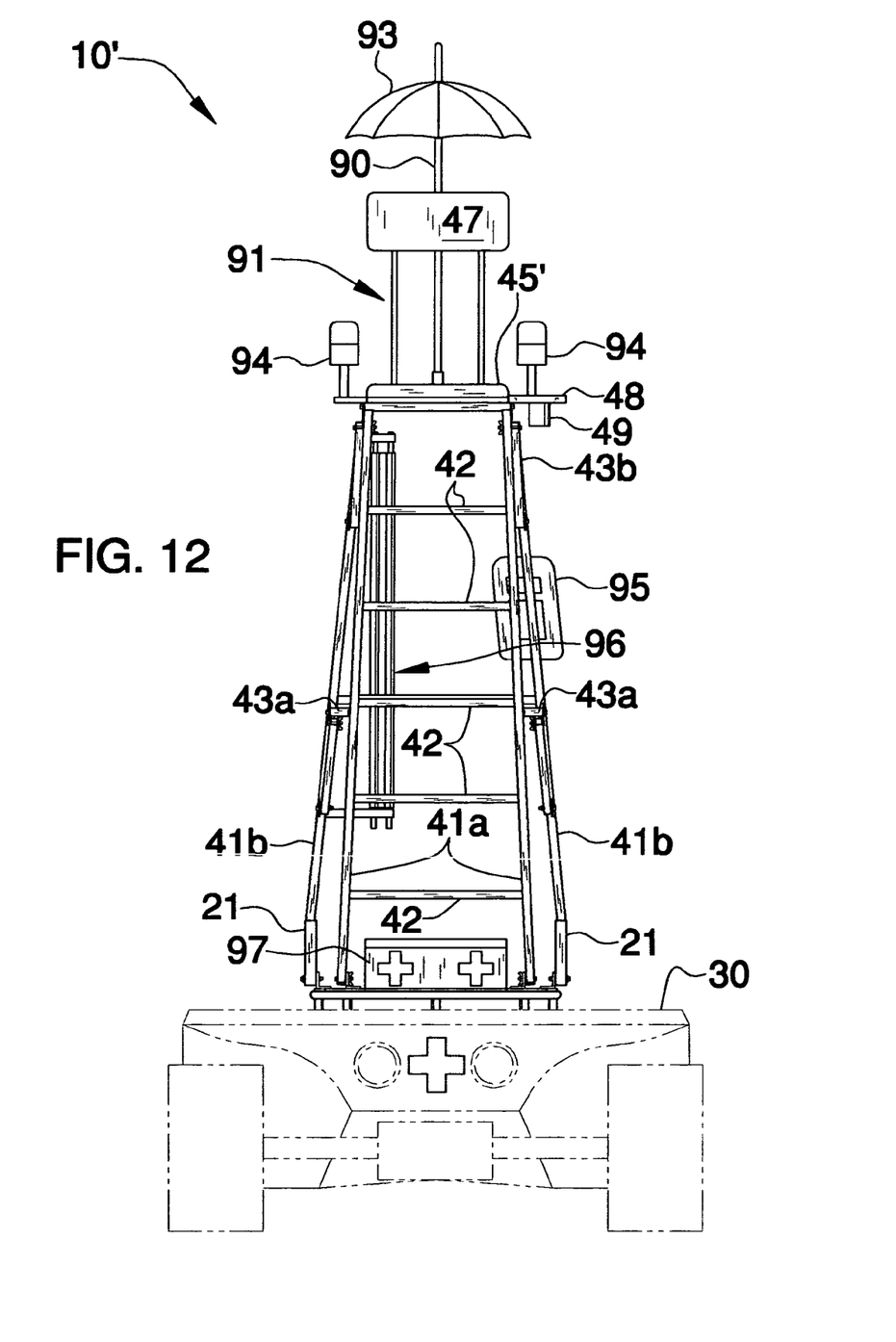
FIG. 12 is a rear elevational view of the present invention shown in FIG. 1, in an alternate embodiment.
Figure 13:
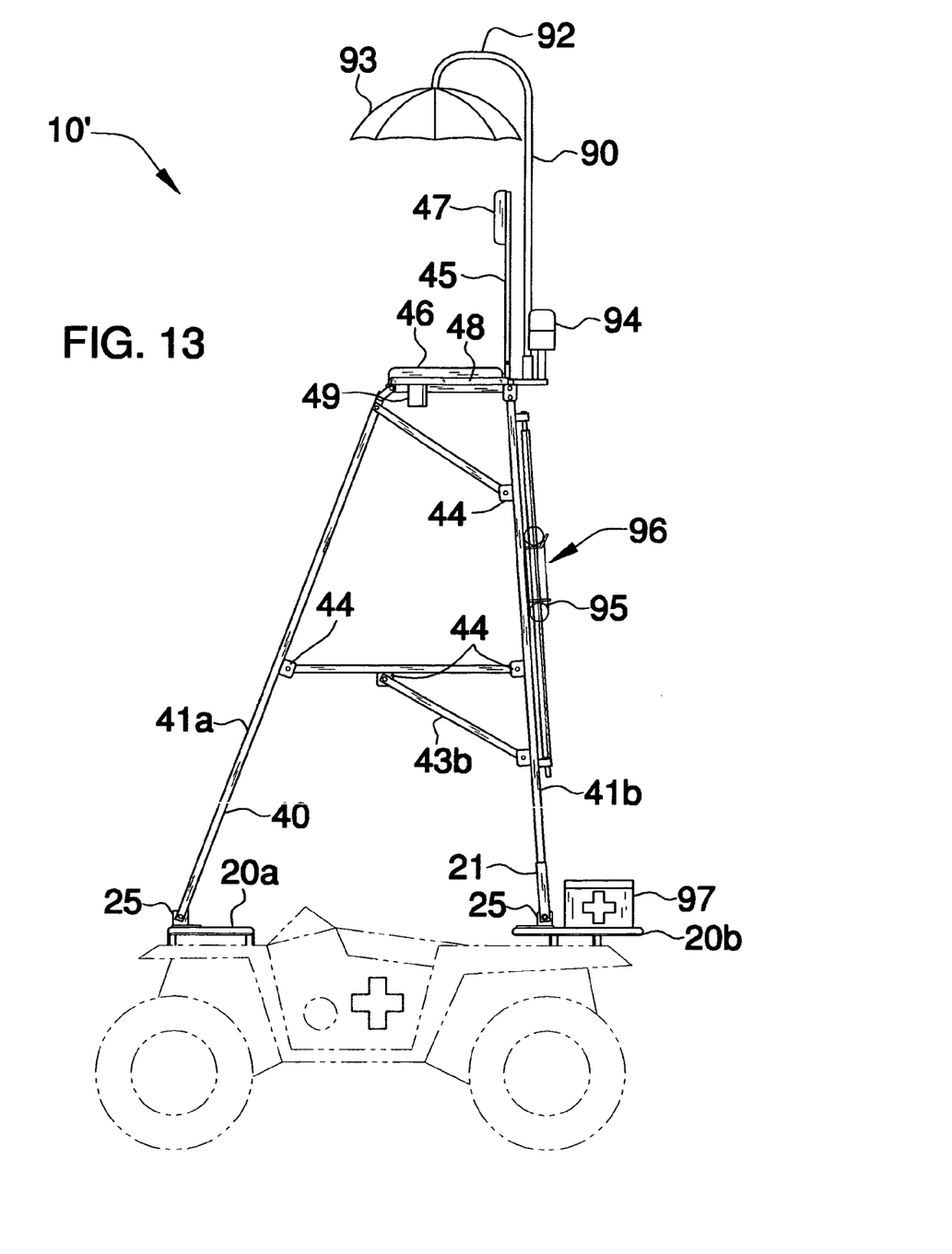
FIG. 13 is a side elevational view of the alternate embodiment of the present invention shown in FIG. 12.

Referring to FIGS. 12 and 13, in an alternate embodiment, the seat section 45' includes an elongated pole 90 extending substantially vertically therefrom. Such a pole 90 has a base portion 91 for providing rigidity and for maintaining the pole 90 at a substantially stable position during operating conditions. The pole 90 further includes a hook portion 92 for attaching an umbrella 93 or other apparatus for providing shade to a user thereto. The seat section 45' further includes a plurality of light emitting devices 94 attached thereto for providing illumination so that spectators are aware of the stand 10 during nighttime conditions. Of course, a plethora of other accessories and equipment such as a medical kit 97, stretcher 96, and flotation devices 95 may be attached to the stand 10 so that they are readily accessible to a user.

Figure 4A:
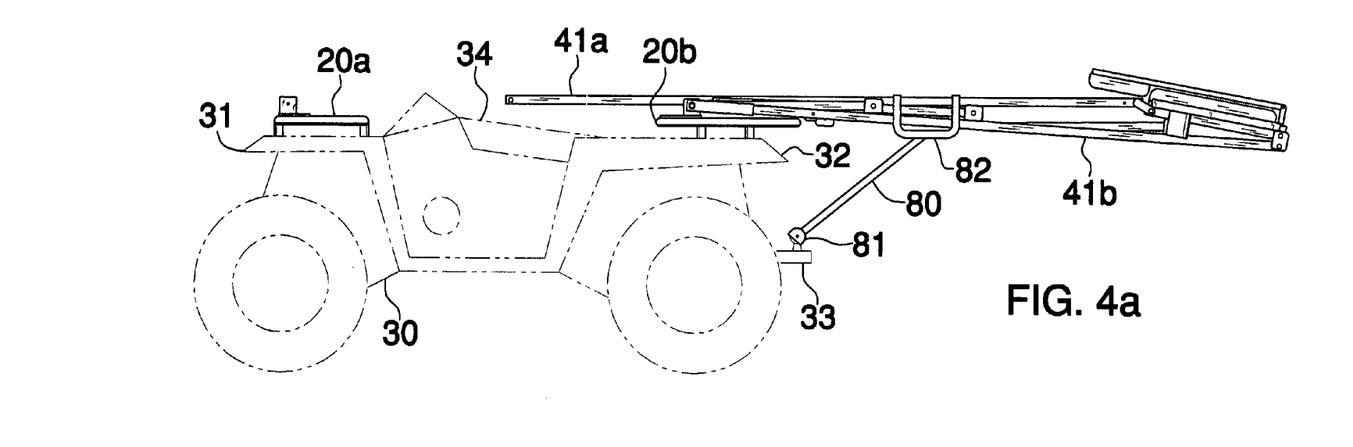
FIG. 4a is a side elevational view of the apparatus shown in FIG. 4 with a support bar attached thereto.

An elastic strap 70, shown in FIG. 4, is removably attachable to the rear rack 20b and traverses across a width of the frame 40 for advantageously assisting to maintain the stand 10 at a substantially stable position during non-operating conditions while the vehicle 30 is in motion and traversing uneven terrain. As can be seen in FIG. 4a, an elongated support rod 80 having an annular female end portion 81 is adjustably attached to a tow ball 33 of the vehicle 30. Such a rod 80 has a male end portion 82 oppositely disposed from the female end portion 81 for engaging a selected portion of the frame 40 during non-operating conditions wherein the rod 80 extends rearwardly and upwardly from the vehicle 30 towards the frame 40.

The front leg pairs 41a are detachable from the front rack 20a when the frame 40 is moved to a lowered position so that the stand 10 can conveniently be folded and aligned rearwardly of the vehicle 30 while allowing the operator to be seated in a driver seat 34 to transport the vehicle 30. Such first 41a and second leg pairs 41b have a greater length than the first 42 and second 43 cross braces respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A hunting stand for supporting an operator at an elevated position, said stand comprising:
    a plurality of racks securely welded to front and rear portions of a vehicle and extending upwardly therefrom, said racks including a plurality of connected tubes and a plurality of support plates attached thereto respectively, said support plates having a predetermined surface area spanning above said racks respectively;
    a frame have a substantially A-shaped and being selectively adaptable between lowered and raised positions, said frame comprising
        a plurality of elongated leg members having bottom end portions disposed adjacent said racks, front and rear pairs of said leg members being positioned at said front and rear vehicle portions respectively,
        a plurality of support members each having an open upper end portion and a lower end portion defining a cavity therebetween, said upper end portions for receiving said bottom end portions of said plurality of elongated leg members therein respectively, said lower end portions being pivotally connected to said racks,
        a first plurality of cross braces secured medially of said front and rear leg pairs respectively and for defining a plurality of steps onto which an operator may climb,
        a second plurality of cross braces pivotally connected to said frame and being disposed intermediately of said front and rear leg pairs for assisting to maintain said frame at a substantially stable position when adapted to a raised position, and
        a plurality of locking flange portions selectively spaced along associated lengths of said second cross braces and said leg members, said locking flange portions being alignable and selectively engageable with said second plurality of cross braces when said frame is moved to the raised position;
    a plurality of brackets for connecting said leg members to said racks respectively;
    a seat section attached to an apex of said frame and being adaptable between operable and non-operable positions as desired by a user;
    an elastic strap removably attachable to said rear rack and traversing across a width of said frame for assisting to maintain said stand at a substantially stable positioned during non-operating conditions; and
    an elongated support rod having an annular female end portion adjustably attached to a tow ball of the vehicle, said rod having a male end portion oppositely disposed from said female end portion and for engaging a selected portion of said frame during non-operating conditions wherein said rod extends rearwardly and upwardly from the vehicle towards said frame;
    wherein said front leg pairs are detachable from said front rack when said frame is moved to a lowered position so that said stand can be folded and aligned rearwardly of the vehicle while allowing the operator to be seated in a driver seat to transport the vehicle, said first and second leg pairs have a greater length than said first and second cross braces respectively.

2. The stand of claim 1, wherein one said second cross braces is positionable along a substantially horizontal plane, other ones of said second cross braces extending obliquely and upwardly from said rear leg pair respectively.

3. The stand of claim 1, wherein said plurality of brackets have substantially L-shapes.

4. The stand of claim 1, wherein said seat section comprises:

pivotally connected lower and rear portions; and a tray laterally extending from said lower portion, said tray being provided with a cup holder disposed horizontally to said lower portion.

5. The stand of claim 1, further comprising:

a first plurality of fastening members for pivotally connecting said rear leg pair to said rear rack, said first fastening members comprising a bolt and locknut secured thereto; and a second plurality of fastening members for pivotally connecting said front leg pair to said front rack, said second fastening members comprising a bolt and wing nut threadably attached thereto for allowing an operator to readily detach said front leg pair during non-operating conditions.

6. The stand of claim 1, further comprising: a plurality of U-shaped brackets and a plurality of associated anchor bolts connected thereto, said U-shaped brackets for maintaining said support plates securely attached to said front and rear racks respectively wherein said leg members have substantially square cross-sections spaced adjacent to said U-shaped brackets and are independently maintained at a substantially stable position during operating conditions.

\* \* \* \* \*